United States Patent
Mizukami et al.

(10) Patent No.: US 7,592,085 B2
(45) Date of Patent: Sep. 22, 2009

(54) FUEL CELL

(75) Inventors: Takaaki Mizukami, Hitachi (JP); Yuuki Okuda, Hitachi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 12/060,888

(22) Filed: Apr. 2, 2008

(65) Prior Publication Data

US 2008/0248360 A1    Oct. 9, 2008

(30) Foreign Application Priority Data

Apr. 3, 2007 (JP) ............................. 2007-096990

(51) Int. Cl.
- H01M 8/10 (2006.01)
- B32B 5/12 (2006.01)
- C25C 1/00 (2006.01)

(52) U.S. Cl. .................... 429/30; 429/33; 428/105; 205/343

(58) Field of Classification Search .............. 429/12–46
See application file for complete search history.

(56) References Cited

U.S. PATENT DOCUMENTS 7,144,476 B2 * 12/2006 Wilde et al. .................. 162/138

2007/0281197 A1   12/2007 Nishimura et al.

FOREIGN PATENT DOCUMENTS

| JP | 2003-109604 | 4/2003 |
| JP | 2006-004879 | 1/2006 |
| JP | 2006-079938 | 3/2006 |
| JP | 2007-323813 | 12/2007 |

* cited by examiner

Primary Examiner—Dah-Wei D Yuan
Assistant Examiner—Bryant Suitte
(74) Attorney, Agent, or Firm—Antonelli, Terry, Stout & Kraus, LLP.

(57) ABSTRACT

A fuel cell comprises an anode oxidizing a fuel, a cathode reducing an oxidizing agent, a polymer electrolyte disposed between the anode and the cathode, whereby an assembly is constituted by the anode, cathode and polymer electrolyte, a pair of gas diffusion layers disposed at both sides of the assembly of the anode, and the cathode, a bipolar plate for providing the fuel to the gas diffusion layer, and another bipolar plate for providing the oxidizing agent to the gas diffusion layer, wherein at least one of the gas diffusion layers includes a porous gas diffusion layer substrate having a hydrophilic surface layer, and wherein particles of a water-repellent material are dispersed in pores of the porous gas diffusion layer substrate. This results in a higher cell voltage and a higher power at a high current density, prevention of a flooding and a longer cell lifetime.

11 Claims, 2 Drawing Sheets

FUEL CELL

CLAIM OF PRIORITY

The present application claims priority from Japanese application serial No. 2007-096990, filed on Apr. 3, 2007, the content of which is hereby incorporated by reference into this application.

BACKGROUND OF THE INVENTION

1. Field of the Invention

The present invention relates to a novel fuel cell.

2. Description of Related Art

Global warming and environmental pollution due to heavy consumption of fossil fuels have become serious more and more. As a possible solution to these issues, fuel cells, such as polymer electrolyte fuel cells that use hydrogen or methanol as a fuel, and oxygen or oxygen-containing gas such as air as an oxidizing agent, have received attention as an alternate for internal-combustion engines that operate with the burning of fossil fuels.

The fuel cells receive attention as clean power generation systems; exhausts of power generation by fuel cells give less influence on the environment. Particularly, they are expected to be used as distributed power sources and as power sources for electric automobiles. In addition, there are attempts to apply fuel cells to high-energy-density power sources for mobile devices.

The fuel cells are roughly classified into as polymer electrolyte fuel cells, phosphoric acid fuel cells, molten carbonate fuel cells, and solid oxide fuel cells, et al. Among them, the polymer electrolyte fuel cells can generate power at relatively low temperatures ranging from room temperature to about 100° C. and an output power with high density, whereby they are most suitable for the above-mentioned uses.

The polymer electrolyte fuel cells generally essentially include a polymer electrolyte, and a pair of carbon layers disposed outside the polymer electrolyte, in which the pair of carbon layers carry catalytic metals for constituting an anode and a cathode, respectively. Hereinafter the carbon layers carrying the catalytic metals are referred as electrode catalyst layers. In addition, an anode gas diffusion layer is disposed adjacent to a side of the anode opposite to the polymer electrolyte, and a cathode gas diffusion layer is disposed adjacent to a side of the cathode opposite to the polymer electrolyte. These gas diffusion layers serve to smoothly diffuse a fuel such as hydrogen or methanol and an oxidizing agent such as air or oxygen gas, respectively.

In the polymer electrolyte fuel cell, hydrogen, if used as a fuel, in the fuel and oxygen in air react each other according to the following Formulae to yield water during power generation.

Anode side: $H_2 \rightarrow 2H^+ + 2e^-$     (1)

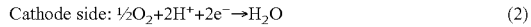

Cathode side: $\frac{1}{2}O_2 + 2H^+ + 2e^- \rightarrow H_2O$     (2)

Total reaction: $H_2 + \frac{1}{2}O_2 \rightarrow H_2O$     (3)

This indicates that the polymer electrolyte fuel cell should smoothly carry out diffusion and migration of hydrogen and oxygen toward the catalysts and water produced as a result of the power generation reactions must be immediately discharged, because the produced water impedes the diffusion and migration of hydrogen and oxygen toward the catalysts. Accordingly, management of material diffusion, such as feeding of gases to the electrodes and removal of produced water, is a very technical important matter in the polymer electrolyte fuel cell. Particularly, in the cathode gas diffusion layer, air is moisturized before being fed to the cathode in order to render the polymer electrolyte moisturized to thereby improve proton conductivity, and, as shown in Formula (2), water is produced as a result of power generation. Accordingly, the cathode and cathode gas diffusion layer are likely to suffer from flooding in which water accumulates in the cathode and cathode gas diffusion layer and impedes the diffusion of the gas.

In the known fuel cells, a gas diffusion layer substrate made typically of a carbon paper or carbon cloth is treated to be water repellent. In the treatment, the gas diffusion layer substrate is impregnated with a dispersion of a water-repellent polymer (a dispersion of fine particles of a water-repellent polymer in an aqueous medium), and the immersed substrate is dried and fired. Examples of such water-repellent polymer include polytetrafluoroethylene (hereinafter abbreviated as PTFE) and copolymers of tetrafluoroethylene and hexafluoropropylene (FEP). Although obtaining the function of discharging water from the gas diffusion layer itself, the resulting gas diffusion layer has pores with sizes larger than the size of the electrode catalyst layer, and this makes it difficult to diffuse the produced water from the electrode catalyst layer into the gas diffusion layer and to discharge toward gas flow passages.

Patent Document 1 discloses a polymer electrolyte fuel cell that includes a gas diffusion electrode. The gas diffusion electrode is composed of an electrode catalyst layer, a porous substrate supporting the electrode catalyst layer, and a water-repellent material applied to the porous substrate, in which the electrode catalyst layer is composed of a polymer electrolyte and powdery carbon carrying catalysts, and the porous substrate is composed of a carbon material. In this gas diffusion electrode, the content of the water-repellent material in the porous substrate continuously varies from one side of the porous substrate adjacent to the electrode catalyst layer to the other side.

Patent Document 2 discloses a gas diffusion layer including a gas diffusion layer substrate and a water-repellent carbon layer, and further including a water-retaining layer between the gas diffusion layer substrate and the water-repellent carbon layer, still further having drainage performance and water retention performance. This configuration improves drainage performance while carrying out moisturization of the electrolyte membrane.

Patent Document 3 discloses a gas diffusion layer having a gas diffusion layer substrate and a water-repellent carbon layer, in which the water-repellent carbon layer includes at least two layers composed of materials having different water repellencies, and one of the at least two layers closer to an electrode has a higher water repellency than that of another layer. Patent Document 3 describes that this improves drainage performance of produced water from the electrode to the gas diffusion layer and improves moisture retention performance and gas diffusivity of electrode.

Patent Document 1: Japanese Patent Laid-open No. 2003-109604

Patent Document 2: Japanese Patent Laid-open No. 2006-79938

Patent Document 3: Japanese Patent Laid-open No. 2006-4879

The gas diffusion electrode disclosed in Patent Document 1 has water repellency that continuously varies and is thereby expected to discharge water more satisfactorily. This prior art, however, lacks a water-repellent carbon layer between the gas diffusion layer substrate and the electrode catalyst layer.

Although this configuration improves the drainage performance in the gas diffusion layer, it impedes the diffusion of the produced water from the electrode catalyst layer toward the gas diffusion layer. The produced water may there by accumulate in the electrode catalyst layer.

The gas diffusion layer disclosed in Patent Document 2 includes the water-retaining layer between the gas diffusion layer substrate and the water-repellent carbon layer, whereby the drainage performance is improved while rendering the electrolyte membrane moisten. However, when operated at a high humidity and a high current density (e.g., 1 A/cm$^2$ or more), produced water in excess accumulates in the water-retaining layer, whereby the gas diffusivity may decrease.

The gas diffusion layer disclosed in Patent Document 3 has the gas diffusion layer substrate and the water-repellent carbon layer, in which the water-repellent carbon layer includes at least two layers composed of materials having different water repellencies, and one of the at least two layers closer to the electrode has a water repellency higher than that of another layer. This improves drainage performance of produced water from the electrode to the gas diffusion layer, humidity retention performance and gas diffusivity. However, although water repellency in the water-repellent carbon layer is improved, drainage performance in the gas diffusion layer substrate according to this prior art may be sufficient, and gas diffusivity may deteriorate.

Accordingly, an object of the present invention is to provide a fuel cell whose drainage performance of produced water in the gas diffusion layer is improved, whereby the fuel cell generates power with high performance.

SUMMARY OF THE INVENTION

A fuel cell comprises an anode oxidizing a fuel, a cathode reducing an oxidizing agent, a polymer electrolyte disposed between the anode and the cathode, whereby an assembly is constituted by the anode, cathode and polymer electrolyte, a pair of gas diffusion layers disposed at both sides of the assembly of the anode, and the cathode, a bipolar plate for providing the fuel to the gas diffusion layer, and another bipolar plate for providing the oxidizing agent to the gas diffusion layer, wherein at least one of the gas diffusion layers includes a porous gas diffusion layer substrate having a hydrophilic surface layer, and wherein particles of a water-repellent material are dispersed in pores of the porous gas diffusion layer substrate.

A fuel cell of the present invention includes a polymer electrolyte; an anode and a cathode disposed to sandwich the polymer electrolyte, anode- and cathode-gas diffusion layers disposed to sandwich the anode and cathode, and anode and cathode-bipolar plates disposed to sandwich the anode- and cathode-gas diffusion layers and each having flow passages. The fuel cell works so that a fuel is fed from the flow passages of the anode-bipolar plate via the anode-gas diffusion layer to the anode and is oxidized in the anode, and that an oxidizing agent is fed from the flow passages of the cathode-bipolar plate via the cathode-gas diffusion layer to the cathode and is reduced in the cathode. In the fuel cell, at least one of the anode- and cathode-gas diffusion layers includes a members constituting a porous gas diffusion layer substrate and having a hydrophilized surface, and particles of a water-repellent material are dispersed in pores of the porous gas diffusion layer substrate.

Such gas diffusion layers should serve to diffuse a fuel or an oxidizing agent and also have function as conductors for outputting generated electric power. Therefore, the porous gas diffusion layer substrate may include, for example, a woven carbon fabric, a nonwoven carbon fabric, a felt-shaped carbon member, or a carbon paper. It may also include a reticular metallic member, a mesh metallic member, an expanded metallic member, a felt-shaped metallic member, a foamed metallic member, or a sintered metallic member.

The surface of members constituting the porous gas diffusion layer substrate is hydrophilized with an organic or inorganic material, and a water-repellent material typified by PTFE in particle form is dispersed in pores of the porous gas diffusion layer substrate. Thus, particles of the water-repellent material having sizes smaller than those of the pores are dispersed in pores of the porous gas diffusion layer substrate, and the surfaces of the members constituting the porous gas diffusion layer substrate has a hydrophilic thin film (a hydrophilic surface layer) formed of an organic or inorganic material on its surface.

As materials for constituting the hydrophilized layer (the hydrophilic surface layer), examples of the inorganic material include titanium oxide, zirconium oxide, tungsten oxide, and silicon oxide. Examples of the organic material include material shaving at least one hydrophilic group selected from phenolic hydroxyl group, carboxyl group, sulfonic group, and carbonyl group. Each of these materials may be applied to the surfaces of the members constituting the porous gas diffusion layer substrate according to a suitable procedure.

Further, the hydrophilic surface layer of the porous gas diffusion layer substrate can be formed of an organic compound having a polar substituent (hydroxide group, carboxyl group, sulfo group, carbonyl group, etc.) containing a heteroatom (nitrogen N, sulfur S, phosphorus P, arsenic As, selenium Se, etc.).

The surfaces of the members constituting the porous gas diffusion layer substrate is hydrophilized, whereby produced water rapidly creeps and moves along the surfaces of the members constituting the porous gas diffusion layer substrate and drainage performance of the produced water from the electrode is improved. Thus, the fuel cell yields a higher cell voltage at a high current density and outputs a greater electric power.

DETAILED DESCRIPTION OF THE INVENTION

The present invention relates to a novel fuel cell which includes a member constituting a porous gas diffusion layer substrate and having a hydrophilized surface (a hydrophilic surface layer), whereby produced water is more satisfactorily discharged from the fuel cell.

Figure 1:
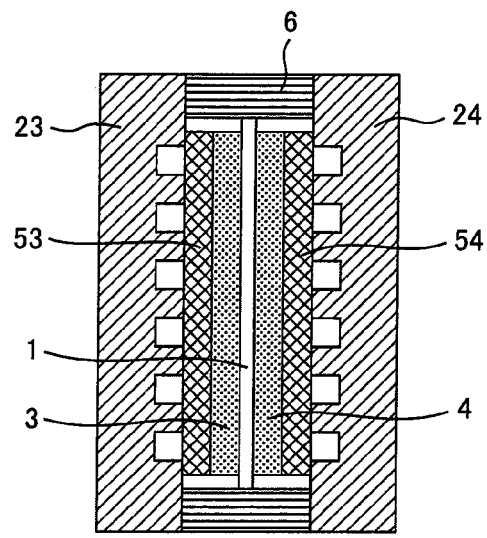
FIG. 1 is a cross sectional view showing an embodiment of a fuel cell in the present invention.

Embodiments of the present invention will be illustrated with reference to the attached drawings. FIG. 1 shows an embodiment of a fuel cell. The fuel cell in FIG. 1 comprises an anode-bipolar plate 23, a cathode-bipolar plate 24, a polymer electrolyte 1, an anode 3, a cathode 4, an anode-gas diffusion layer 53, a cathode-gas diffusion layer 54, and gaskets 6. The anode 3 and the cathode 4 are integrated with the polymer electrolyte 1 to form a membrane electrode assembly (hereinafter also abbreviated as MEA). The gaskets 6 are preferably composed of materials that are isolative, allow less hydrogen permeation, and retain hermetic, such as isobutylene-isoprene rubber, fluororubbers (e.g., Viton rubber), and terpolymer rubbers of ethylene, propylene, and diene (EPDM).

The anode-bipolar plate 23 and cathode-bipolar plate 24 are electroconductive, and preferred examples of materials of them include dense graphite plates; carbon plates as molded articles of a carbon material such as graphite or carbon black with a resin; and metallic materials having excellent corrosion resistance, such as stainless steel and titanium.

It is also desirable to treat the surfaces of the anode-bipolar plate 23 and cathode-bipolar plate 24 by plating with a noble metal and applying a film of an electroconductive coating agent having high corrosion resistance and high heat resistance. The anode-bipolar plate 23 and cathode-bipolar plate 24 have grooves on sides facing the anode 3 and cathode 4, respectively. A fuel gas or fuel liquid is fed to the grooves of the anode-bipolar plate 23, and an oxidizing agent such as oxygen or air is fed to the grooves of the cathode-bipolar plate 24.

Polymer electrolytes contained in the polymer electrolyte 1 (membrane) and in electrode catalyst layers of the anode 3 and cathode 4 may comprise a polymer material that is proton-conductive. Examples of the material include sulfonated or alkylene-sulfonated fluoropolymers and polystyrenes typified by perfluorocarbonsulfonic acid resins and polyperfluorostyrenesulfonic acid resins; as well as polysulfones, poly(ether sulfone)s, poly(etherethersulfone)s, poly(ether ether ketone)s, and sulfonated hydrocarbon polymers.

The catalytic metals of the electrode catalyst layers of the anode 3 and cathode 4 are preferably an alloy containing at least platinum for the cathode 4, and an alloy containing at least platinum or ruthenium for the anode 3. Thus, a higher cell voltage with less dropping due to poisoning typically by carbon monoxide (CO) may be obtained. However, the catalytic metals for use in this embodiment are not limited thereto, and catalysts containing these noble metals and further containing one or more additional components selected typically from iron, tin, and rare earth elements may be used for increasing the stability and for prolonging the lifetime of the electrode catalysts.

The electrode catalyst layers each contain a carrier carbon. The carrier carbon carries the catalytic metal in the form of fine particles, and is preferably carbon black having a large specific surface area of preferably 50 to 1500 $m^2/g$. A carrier carbon having an excessively small specific surface area of less than 50 $m^2/g$ is not preferred, because it may fail to carry predetermined amounts of finely divided and dispersed particles, on the order of nanometers, of catalytic metals for the anode and cathode of the fuel cell. If failing to carry finely dispersed catalytic particles, the catalytic metals have greater particle diameters, whereby have reduced reaction activities, resulting in reduced cell properties. In contrast, a carrier carbon having an excessively large specific surface area of more than 1500 $m^2/g$ is also not preferred, because it may have unstable properties as carrier carbon, whereby may cause defects during the preparation of the catalyst or render the catalyst unstable after its preparation.

When hydrogen gas and air are used as the fuel and oxidizing agent, respectively, reactions represented by Formulas (1) and (2) occur in the anode 3 and cathode 4, respectively, to generate electricity. When an aqueous methanol solution (liquid) is used as the fuel, reactions represented by following Formula (4) and above-mentioned Formula (2) occur in the anode 3 and cathode 4, respectively, to generate electricity.

$$CH_3OH+H_2O \rightarrow CO_2+6H^++6e^- \quad (4)$$

Protons produced in the anode 3 migrate through the polymer electrolyte 1 toward the cathode 4. The protons react with oxygen to produce water according to Formula (2) in the cathode 4.

The anode-gas diffusion layer 53 functions to feed the anode 3 with a fuel gas or fuel liquid. The cathode-gas diffusion layer 54 functions to feed the cathode 4 with an oxidizing agent such as oxygen or air. For these functions, the gas diffusion layers should have following properties. Firstly, they should have pores that penetrate the layers in a thickness direction and have sizes suitable for the diffusion of the respective gases. Secondly, they should have suitable electroconductivity including adequately low contact resistance with the corresponding bipolar plate and electrode. Thirdly, they should have sufficient resistance to clamping, because members constituting a single cell, and a stack composed of assembly of single cells are cramped with pressing in order to achieve gas sealing and reduce contact resistance. Fourthly, the members of these layers should have small thickness in order to shorten the distance within which the respective gases diffuse or migrate and to reduce electrical resistance. Fifthly, these layers should be self-sustaining to retain their shapes, because they are integrated with other members upon assembling of the fuel cell.

For having these properties, both the cathode- and anode-gas diffusion layers preferably include a substrate that is electroconductive, self-sustaining, in thin plate form, and porous. Examples of such a porous gas diffusion layer substrate include carbon materials such as a woven carbon fabric, a nonwoven carbon fabric, a felt-shaped carbon member, and a carbon paper; as well as metallic materials such as a reticular metallic member, a mesh metallic member, an expanded metallic member, a felt-shaped metallic member, and a foamed metallic member.

Figure 4:
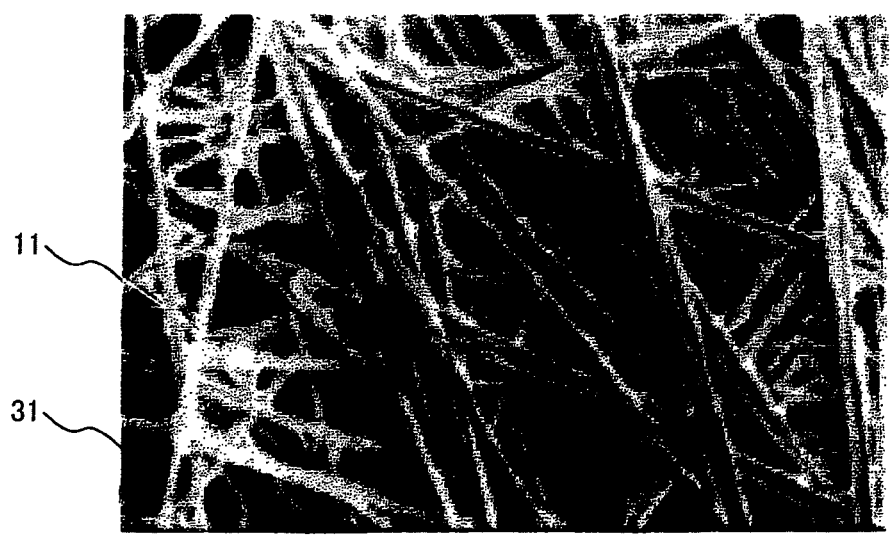
FIG. 4 is an image of a scanning electron microscope (SEM) illustrating a porous gas diffusion layer substrate.

FIG. 4 is a scanning electron microscope (SEM) image of a carbon paper as an example of the porous gas diffusion layer substrate. Carbonaceous fibers as members 11 of gas diffusion layer substrate extend and intersect each other, and spaces between them form pores 31 of the gas diffusion layer substrate. The carbon fibers constitute a self-sustaining thin plate as a gas diffusion layer substrate. The pores between the carbon fibers form flow passages for the fuel in the anode-gas diffusion layer 53 and form flow passages for the oxidizing agent such as oxygen in the cathode-gas diffusion layer 54. The surfaces of the carbon fibers are hydrophilized, whereby water creeps on the hydrophilized surfaces of the carbon fibers.

Other porous gas diffusion layer substrates usable herein have various dimensions and properties. For example, they may contain carbon materials or metallic materials, be in fibrous form or in three-dimensional network form, and have pores with different sizes. These porous gas diffusion layer substrates can be suitably selected according to the purpose.

Figure 2:
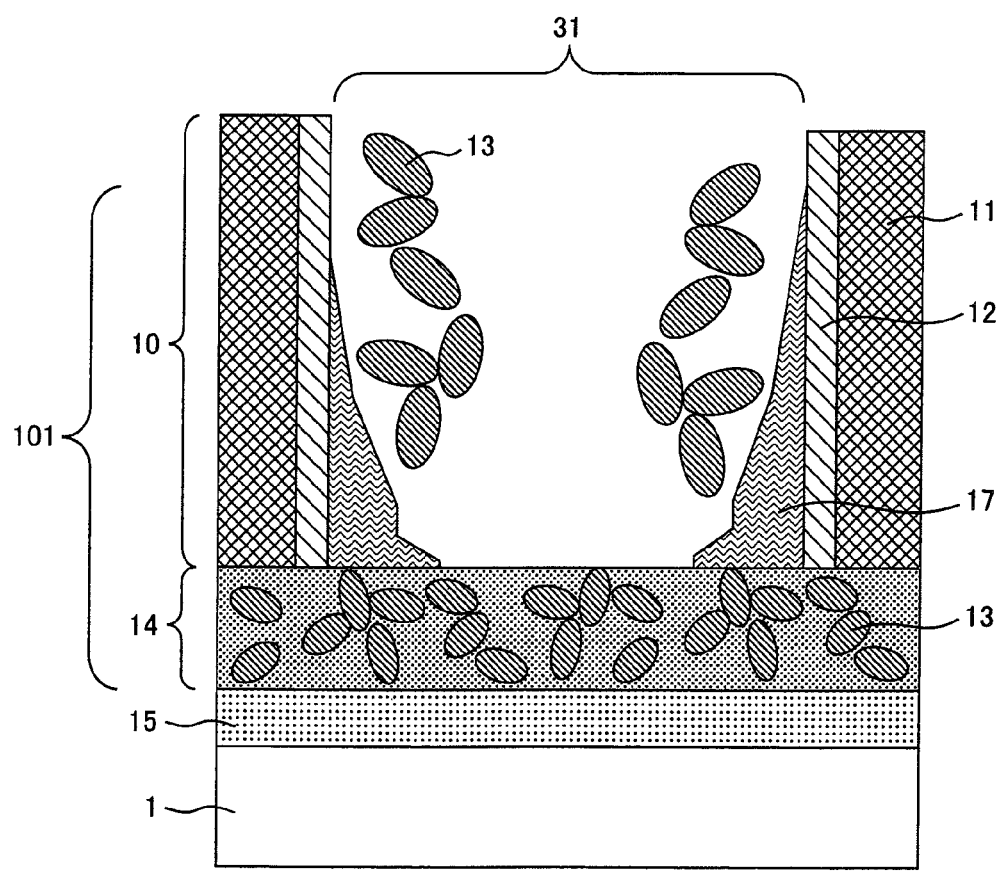
FIG. 2 is an enlarged cross sectional view showing an embodiment of a gas diffusion layer in the present invention.

The configuration of a gas diffusion layer for use in an embodiment of the present invention will be illustrated with reference to FIG. 2. The configuration in FIG. 2 is in common both for the anode and cathode. An electrode catalyst layer 15 serving as an anode or a cathode is disposed adjacent to the polymer electrolyte 1. A gas diffusion layer 101 is disposed adjacent to the electrode catalyst layer 15. The gas diffusion layer 101 includes a gas diffusion layer substrate 10 coated with a water-repellent carbon layer 14. An anode- or cathode-bipolar plate will be disposed adjacent to the gas diffusion layer 101. Members 11 constituting the gas diffusion layer substrate 10 each have a hydrophilic surface layer 12 as a hydrophilic thin film of an organic or inorganic material. Particles 13 of a water-repellent material are dispersed in pores 31 formed between the members 11.

Product water 17 produced as a result of power generation penetrates the water-repellent carbon layer 14, reaches the hydrophilized surface of the members 11 of the gas diffusion layer substrate 10, then creeps along the hydrophilic surface layer 12 of the members 11, diffuses in the gas diffusion layer toward a bipolar plate (not shown), and is discharged from the bipolar plate. On the other hand, the pores 31 become water-repellent by the actions of the water-repellent particles 13 dispersed therein, whereby the produced water does not accumulate or remain therein, and there remain spaces in which oxygen gas can diffuse, whereby oxygen gas diffuses from a bipolar plate (not shown) toward the electrode. Thus gas diffusion layer 101 is provided with a flow passage for discharging produced water and another flow passage for diffusing a gas separately, whereby it discharges water and diffuses a gas more satisfactorily, to increase the cell voltage at a high current density to thereby yield a higher output. In addition, the gas diffusion layerless suffers from flooding to prolong the lifetime of the fuel cell.

The content of the water-repellent particles 13 is preferably 1 to 40 percent by weight based on the total amount of the gas diffusion layer substrate and the water-repellent particles. If content of water-repellent particles 13 is more than 40 percent by weight, the water-repellent particles 13 may clog the pores 31 of the gas diffusion layer substrate 10 to impede the diffusion of gas. And if content of water-repellent particles 13 is less than 1 percent by weight, the water-repellent particles 13 may fail to impart sufficient water repellency to the gas diffusion layer substrate 10, whereby water may condense and accumulate in the pores to clog them, and this may inhibit the gas from diffusing.

The gas diffusion layer has the above configuration, whereby produced water creeps along the surface of the hydrophilized member, is discharged from the gas diffusion layer; and the fuel or oxidizing agent diffuses in the pores of the gas diffusion layer substrate and reaches the anode or cathode. The average diameter (a particle diameter) of the water-repellent particles 13 are preferably smaller than the average diameter (a pore size) of the pores 31 formed between the members 11 of the gas diffusion layer substrate 10. The average thickness of the hydrophilic surface layer 12 disposed on the surfaces of the members 11 constituting the gas diffusion layer substrate is preferably from 0.001 to 1 μm. The diameters of the pores 31 in the gas diffusion layer substrate 10 generally range from 1 to 100 μm, and if the hydrophilic surface layer 12 has a thickness larger than 1 μm, part of the pores 31 in the gas diffusion layer substrate 10 may be clogged. In contrast, if the hydrophilic surface layer 12 has a thickness smaller than 0.001 μm, the hydrophilic surface layer 12 may fail to exhibit sufficient hydrophilic property, and this may impede migration of water along the surfaces of the members 11 constituting the gas diffusion layer substrate.

Examples of materials for the hydrophilic surface layer 12 include metal oxides, metal oxidehydrates, organic polymers, and metal complexes. As the metal oxides, preferred examples are titanium oxide ($TiO_2$) and zirconium oxide ($ZrO_2$) that will be stable at acidity in the polymer electrolyte and at a potential in the anode or cathode. As the metal oxide hydrates, preferred examples are zirconium oxide hydrate ($ZrO_2 \cdot nH_2O$), hydrotungstite ($WO_4(OH)_2 \cdot H_2O$), silicon oxide hydrate ($SiO_2 \cdot nH_2O$) and titanium oxide hydrate ($TiO_2 \cdot nH_2O$). A material for the water-repellent particles 13 can be, for example, dispersion typically of PTFE.

Each of the anode- and cathode-gas diffusion layers 53 and 54 is formed by applying a water-repellent carbon layer 14 to one side of the gas diffusion layer substrate 10. Such a water-repellent carbon member may be prepared, as is widely known in the art, by dispersing powdery carbon in a solution of surfactant, adding a water-repellent material such as dispersion of PTFE thereto, sufficiently mixing the mixture to give a slurry of water-repellent carbon, applying the slurry to a porous gas diffusion layer substrate, drying, and thereby yielding a gas diffusion layer.

A side of the cathode-gas diffusion layer 54 carrying the water-repellent carbon layer is disposed adjacent to the cathode side of the membrane-electrode assembly, and the other side is disposed adjacent to the cathode-bipolar plate 24. Likewise, a side of the anode-gas diffusion layer 53 carrying the water-repellent carbon layer is disposed adjacent to the anode side of the membrane-electrode assembly, and the other side is disposed adjacent to the anode-bipolar plate 23. Thus, a cell unit is constructed.

Each of reactants relating to reactions in the fuel cell diffuses in the gas diffusion layer in a direction perpendicular to the layer plane. Specifically, with reference to FIG. 1, the fuel such as a gas or liquid is fed from the anode-bipolar plate 23 toward the anode-gas diffusion layer 53, diffuses through the anode-gas diffusion layer 53 in a direction perpendicular to the layer plane, and reaches the anode 3. The oxidizing agent such as oxygen gas or air is fed from the cathode-bipolar plate 24 toward the cathode-gas diffusion layer 54, diffuses through the cathode-gas diffusion layer 54 in a direction perpendicular to the layer plane, and reaches the cathode 4.

When hydrogen gas is used as the fuel, water is produced in the cathode 4 as a result of reactions represented by Formula (1) and (2). Likewise, when methanol is used as the fuel, water is produced in the cathode 4 as a result of reactions represented by Formula (3) and (2). The produced water diffuses through the cathode-gas diffusion layer 54 in a direction perpendicular to the layer plane, reaches the cathode-bipolar plate 24, and is discharged out of the fuel cell.

In contrast, a gas diffusion layer according to a known prior art is, for example, composed of a laminate of two or more layer-like members having different water repellencies. The water produced in water vapor form in the cathode diffuses through the gas diffusion layer in a cross sectional direction (direction perpendicular to the layer plane). During this process, the water vapor is highly likely to condense to deposit as liquid water in a portion of the gas diffusion layer having lower water repellency, and the condensed water clogs the pores of the gas diffusion layer. This impedes the gas diffusion and deteriorates the cell performance.

An embodiment of a process for the preparation of a gas diffusion layer according to an embodiment of the present invention will be illustrated below. A porous gas diffusion layer substrate is impregnated with a solution of a metal alkoxide, then immersed in distilled water to hydrolyze the metal alkoxide to give a metal oxide; the metal oxide is applied to the surface of pores in the porous gas diffusion layer substrate and is dried. The porous gas diffusion layer substrate carrying the metal oxide on its surface is impregnated with a predetermined amount of a dispersion of water-repellent material, followed by drying.

Next, powdery carbon is dispersed in a solution of a surfactant and then combined with a dispersion of a water-repellent material with sufficient stirring to give a water-repellent carbon slurry. The water-repellent carbon slurry is applied to one side of the porous gas diffusion layer substrate by screen printing or coating with an applicator to form a water-repellent carbon layer, followed by drying. The porous gas diffusion layer substrate having the water-repellent carbon layer on one side thereof is fired to decompose the surfactant, pressed to smoothen the surface, and thereby yields a gas diffusion layer according to this embodiment.

Another embodiment of a process for the preparation of the gas diffusion layer according to this embodiment will be illustrated below. A predetermined amount of a solution of a metal alkoxide is added dropwise to distilled water to hydrolyze the metal alkoxide to give a dispersion of a metal oxide. A porous gas diffusion layer substrate is impregnated with the dispersion of metal oxide, followed by drying. The porous gas diffusion layer substrate carrying the metal oxide on its surface is impregnated with a predetermined amount of a dispersion of a water-repellent material, followed by drying.

Next, powdery carbon is dispersed in a solution of surfactant and combined with a dispersion of a water-repellent material with sufficient stirring to give a water-repellent carbon slurry. The water-repellent carbon slurry is applied to one side of the porous gas diffusion layer substrate carrying the metal oxide such as a titanium oxide and water-repellent material such as a polytetrafluoroethylene (PTFE) to form a water-repellent carbon layer, followed by drying. Then the porous gas diffusion layer substrate bearing the water-repellent carbon layer on one side thereof is fired to decompose the surfactant, is pressed to smoothen the surface to thereby yield a gas diffusion layer according to this embodiment.

The concentration of a liquid for impregnation is adjusted depending on the amount of liquid retained in the gas diffusion layer substrate, whereby the thickness of the hydrophilic surface layer to be formed on the surface of the substrate is controlled. For example, use of a liquid having a high concentration makes the hydrophilic surface layer thick.

Procedures for forming a hydrophilic surface layer on the gas diffusion layer substrate include, in addition to the hydrolysis of metal alkoxide as mentioned above, known procedures such as impregnation with a metallic compound, and a sol-gel method. In any case, the thickness of the hydrophilic surface layer on the surface of pores in the porous gas diffusion layer substrate is preferably 0.001 to 1 μm. The thickness of the hydrophilic surface layer is measured according to a known procedure such as scanning electron microscope (SEM) imaging.

According to the above-mentioned process, the surfaces of the members constituting the gas diffusion layer substrate is initially hydrophilized to give hydrophilized surfaces of the members constituting the gas diffusion layer substrate. Then a water-repellent material is dispersed in pores formed between the members, whereby the water-repellent material repels the hydrophilic surface layer on the surfaces of the members and less covers the members. Thus, the water-repellent material is uniformly dispersed in pores between the members. This eliminates the inhibition of dispersion of material gases by the produced water in the gas diffusion layer.

The present invention will be illustrated in further detail with reference to several embodiments and comparative examples below. It should be noted, however, these are illustrated only by way of embodiment and never construed to limit the scope of the present invention.

FIRST EMBODIMENT

A solution of titanium isopropoxide was added dropwise to distilled water for decomposition, to yield a solution of titanium oxide. Next, a carbon paper (Toray Industries, Inc.; TGP-H-60) as a gas diffusion layer substrate was impregnated with a predetermined amount of the solution of titanium oxide so as to carry 3 percent by weight of titanium oxide. The impregnated gas diffusion layer substrate was immersed in distilled water at 50° C. overnight, thoroughly washed with distilled water, and dried in an air-forced furnace at 120° C. for two hours. Next, the gas diffusion layer substrate carrying titanium oxide was impregnated with a predetermined amount of a PTFE dispersion (Daikin Industries, Ltd. under the trade names of POLYFLON™ D-1E diluted) so as to carry 10 percent by weight of PTFE, followed by drying in an air forced furnace at 120° C. for one hour.

Next, powdery carbon (Ketjenblack) was dispersed in a surfactant solution (3 percent by weight Triton™-X100; EMD Biosciences Inc.), the dispersion was combined with a predetermined amount of PTFE, and thereby yielded a water-repellent carbon slurry containing 20 percent by weight of PTFE a water-repellent carbon slurry. Next, the water-repellent carbon slurry was applied by screen printing to the gas diffusion layer substrate carrying titanium oxide and PTFE to form a water-repellent carbon layer, followed by drying in an air forced furnace at 120° C. for one hour. Then the article was fired in air forced furnace at 300° C. for one hour to decompose the surfactant, followed by pressing to smoothen the surface, to thereby yield a gas diffusion layer.

An electrode catalyst composed of carbon black carrying 50 percent by weight of platinum was used as an anode and a cathode. The electrode catalyst was combined with a 5 percent by weight solution (Aldrich) of Nafion™ (DuPont) to a weight ratio of the electrode catalyst to the Nafion™ solution of 1:9, and the mixture was stirred while evaporating the solvent, to yield a viscous electrode catalyst slurry. The electrode catalyst slurry was applied to a polytetrafluoroethylene sheet by screen printing, dried to remove the solvent in slurry, and thereby yielded an electrode catalyst layer containing 0.5 milligram of platinum per unit area of square centimeter. Two plies of the electrode catalyst layer were bonded by hot pressing to both sides of a Nafion™ 112 membrane (DuPont; 50 μm in thickness) as a polymer electrolyte to yield a membrane electrode assembly (MEA). The MEA was disposed between two plies of the above-prepared gas diffusion layer, and thereby yielded a fuel cell as illustrated in FIG. 1.

The above-prepared fuel cell as illustrated in FIG. 1 including the gas diffusion layers according to First Embodiment was subjected to a power generation test at normal atmospheric pressure using hydrogen and air. The power generation was conducted under conditions of a cell temperature, a cathode humidifying temperature, and an anode humidifying temperature of 70° C., a hydrogen utilization of 80%, and an air utilization of 40%.

The fuel cell uses hydrophilized gas diffusion layers prepared by impregnating a gas diffusion layer substrate with a titanium oxide solution. Thus, the fuel cell shows a high cell voltage of 0.4 V at a current density of 1.5 A/cm$^2$ as shown as First Embodiment in FIG. 3, demonstrating that the gas diffusion layers show sufficient performance when used in a MEA for a fuel cell.

SECOND EMBODIMENT

A carbon paper (Toray Industries, Inc.; TGP-H-60) as a gas diffusion layer substrate was impregnated with a predetermined amount of a titanium isopropoxide solution so as to carry 3 percent by weight of titanium oxide. This was immersed in distilled water at 50° C. overnight to decompose titanium isopropoxide into titanium oxide, whereby the gas diffusion layer substrate carried titanium oxide. The gas diffusion layer substrate was thoroughly washed with distilled water and dried in an air-forced furnace at 120° C. for two hours. Next, the gas diffusion layer substrate carrying titanium oxide was impregnated with a predetermined amount of a PTFE dispersion (Daikin Industries, Ltd.; POLYFLON™ D-1E diluted) so as to carry 10 percent by weight of PTFE, followed by drying in an air forced furnace at 120° C. for one hour.

Next, powdery carbon (Ketjenblack) was dispersed in a surfactant solution (3 percent by weight Triton™-X100; EMD Biosciences Inc.), the dispersion was combined with a predetermined amount of PTFE, and thereby yielded a water-repellent carbon slurry containing 20 percent by weight of PTFE a water-repellent carbon slurry. Next, the water-repellent carbon slurry was applied by screen printing to the gas diffusion layer substrate carrying titanium oxide and PTFE to form a water-repellent carbon layer, followed by drying in an air forced furnace at 120° C. for one hour. Then the article was fired in air forced furnace at 300° C. for one hour to decompose the surfactant, followed by pressing to smoothen the surface, to thereby yield a gas diffusion layer.

An electrode catalyst composed of carbon black carrying 50 percent by weight of platinum was used as an anode and a cathode. The electrode catalyst was combined with a 5 percent by weight solution (Aldrich) of Nafion™ (DuPont) to a weight ratio of the electrode catalyst to the Nafion™ solution of 1:9, and the mixture was stirred while evaporating the solvent, to yield a viscous electrode catalyst slurry. The electrode catalyst slurry was applied to a polytetrafluoroethylene sheet by screen printing, dried to remove the solvent in the slurry, and thereby yielded an electrode catalyst layer containing 0.5 milligram of platinum per unit area of square centimeter. Two plies of the electrode catalyst layer were bonded by hot pressing to both sides of a Nafion™ 112 membrane (DuPont; 50 µm in thickness) as a polymer electrolyte to yield a membrane electrode assembly (MEA). The MEA was disposed between two plies of the gas diffusion layer according to Second Embodiment, and thereby yielded a fuel cell as illustrated in FIG. 1.

The above-prepared fuel cell as illustrated in FIG. 1 including the gas diffusion layers according to Second Embodiment was subjected to a power generation test at normal atmospheric pressure using hydrogen and air. The power generation was conducted under conditions of a cell temperature, a cathode humidifying temperature, and an anode humidifying temperature of 70° C., a hydrogen utilization of 80%, and an air utilization of 40%.

The fuel cell uses hydrophilized gas diffusion layers prepared by impregnating a gas diffusion layer substrate with a titanium isopropoxide solution and then hydrolyzing titanium isopropoxide. Thus, the fuel cell shows a high cell voltage of 0.2 V at a current density of 1.5 A/cm$^2$ as shown as Second Embodiment in FIG. 3, demonstrating that the gas diffusion layers show sufficient performance when used in a MEA for a fuel cell.

COMPARATIVE EXAMPLE

A gas diffusion layer was prepared by the procedure of First Embodiment, except for eliminating the step of allowing the gas diffusion layer substrate to carry titanium oxide to be a hydrophilic surface layer.

A carbon paper (Toray Industries, Inc.,; TGP-H-60) as a gas diffusion layer substrate was impregnated with a predetermined amount of a PTFE dispersion (Daikin Industries, Ltd.; POLYFLON™ D-1E diluted) so as to carry 10 percent by weight of PTFE, followed by drying in an air forced furnace at 120° C. for one hour. Next, powdery carbon (Ketjenblack) was dispersed in a surfactant solution (3 percent by weight Triton™-X100; EMD Biosciences Inc.), the dispersion was combined with a predetermined amount of PTFE, and thereby yielded a water-repellent carbon slurry containing 20 percent by weight of PTFE. Next, the water-repellent carbon slurry was applied by screen printing to the gas diffusion layer substrate carrying titanium oxide and PTFE to form a water-repellent carbon layer, followed by drying in an air forced furnace at 120° C. for one hour. Then the article was fired in air forced furnace at 300° C. for one hour to decompose the surfactant, followed by pressing to smoothen the surface, to thereby yield a gas diffusion layer.

An electrode catalyst composed of carbon black carrying 50 percent by weight of platinum was used as an anode and a cathode. The electrode catalyst was combined with a 5 percent by weight solution (Aldrich) of Nafion™ (DuPont) to a weight ratio of the electrode catalyst to the Nafion™ solution of 1:9, the mixture was stirred while evaporating the solvent, to yield a viscous electrode catalyst slurry. The electrode catalyst slurry was applied to a polytetrafluoroethylene sheet by screen printing, dried to remove the solvent in the slurry, and thereby yielded an electrode catalyst layer containing 0.5 milligram of platinum per unit area of square centimeter. Two plies of the electrode catalyst layer were bonded by hot pressing to both sides of a Nafion™ 112 membrane (DuPont; 50 µm in thickness) as a polymer electrolyte to yield a membrane electrode assembly (MEA). The MEA was disposed between two plies of the gas diffusion layer according to Comparative Example, and thereby yielded a fuel cell as illustrated in FIG. 1.

The above-prepared fuel cell as illustrated in FIG. 1 including the gas diffusion layers according to Comparative Example was subjected to a power generation test at normal atmospheric pressure using hydrogen and air. The power generation was conducted under conditions of a cell temperature, a cathode humidifying temperature, and an anode humidifying temperature of 70° C., a hydrogen utilization of 80%, and an air utilization of 40%.

Figure 3:
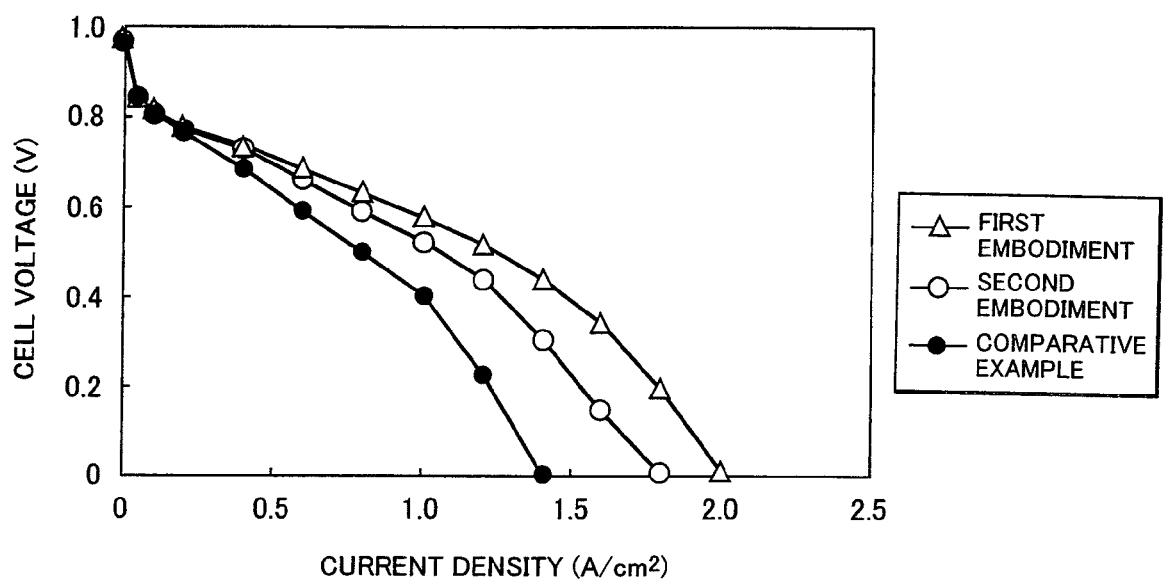
FIG. 3 is a graph illustrating power generation performance of embodiments in the present invention, and of a comparative example.

With reference to FIG. 3, the fuel cell using the gas diffusion layer which has not been hydrophilized generates a cell voltage of 0.4 V at a lower current density of 1 A/cm$^2$ than the fuel cells according to First Embodiment and Second Embodiment using hydrophilized gas diffusion layers. The fuel cell according to Comparative Example fails to generate power at a high current density of 1.5 A/cm$^2$ or more.

As illustrated in Examples 1 and 2, the gas diffusion layer substrates are hydrophilized by the action of a titanium oxide solution or titanium isopropoxide solution, whereby produced water is rapidly discharged via the hydrophilized gas diffusion layers out of the electrodes. Thus, the fuel cells using the gas diffusion layers can generate electric power at a high current density of 1.5 A/cm$^2$ or more and can output high power.

What is claimed is:

1. A fuel cell comprising;
    an anode for oxidizing a fuel,
    a cathode for reducing an oxidizing agent,
    a polymer electrolyte disposed between the anode and the cathode, an assembly being constituted by the anode, polymer electrolyte and cathode,
    a pair of gas diffusion layers each disposed at one side of the anode and at one side of the cathode of the assembly,
    a bipolar plate for providing the fuel to one of the gas diffusion layers, and
    another bipolar plate for providing the oxidizing agent to the other of the gas diffusion layers,
    wherein at least one of the gas diffusion layers includes a gas diffusion layer substrate which comprises a plurality of members having spaces therebetween, the spaces forming pores of the gas diffusion layer, and which is subjected to surface treatment with a hydrophilic agent to form a hydrophilic surface layer, and wherein particles of a water-repellent material are dispersed on a surface of the hydrophilic surface layer in the pores.

2. The fuel cell according to claim 1, wherein the gas diffusion layer substrate comprises at least one selected from the group consisting of a woven carbon fabric, a nonwoven carbon fabric, a felt-shaped carbon member and a carbon paper.

3. The fuel cell according to claim 1, wherein the gas diffusion layer substrate comprises at least one selected from the group consisting of a net-like metallic member, a mesh metallic member, an expanded metallic member, a felt-shaped metallic member, a foamed metallic member, and a sintered metallic member.

4. The fuel cell according to claim 1, wherein the hydrophilic surface layer of the porous gas diffusion layer substrate is formed of at least one selected from the group consisting of metal oxides, metal oxide hydrates, and metal hydroxides.

5. The fuel cell according to claim 1, wherein the hydrophilic surface layer of the gas diffusion layer substrate is formed of an organic compound having a polar substituent containing a hetero-atom.

6. The fuel cell according to claim 4, wherein the hydrophilic surface layer of the porous gas diffusion layer substrate is formed of at least one selected from the group consisting of titanium oxide, zirconium oxide, tungsten oxide and silicon oxide.

7. The fuel cell according to claim 5, wherein the hydrophilic surface layer of the porous gas diffusion layer substrate is formed from a material having at least one hydrophilic group selected from the group consisting of phenolic hydroxyl group, carboxyl group, sulfonic group and carbonyl group.

8. The fuel cell according to claim 4, wherein an average pore size P of the gas diffusion layer substrate, an average particle diameter D of the water-repellent material and an average thickness T of the hydrophilic surface layer satisfy the following condition:

$P>D>T$.

9. The fuel cell according to claim 4, wherein the hydrophilic surface layer disposed on the surface of the porous gas diffusion layer substrate has a thickness of 0.001 to 1 micrometer.

10. The fuel cell according to claim 1, wherein the content of the particles of the water-repellent material dispersed in the pores of the gas diffusion layer substrate is 1 to 40 percent by weight based on the total weight of the porous gas diffusion layer substrate and the particles of the water-repellent material.

11. The fuel cell according to claim 1, wherein the members are intersecting carbon fibers.

* * * * *